United States Patent
Kuhlmann et al.

(10) Patent No.: US 9,382,469 B2
(45) Date of Patent: Jul. 5, 2016

(54) PROCESS FOR THE PRODUCTION OF COATED PROPPANTS

(75) Inventors: Peter Kuhlmann, Wülfrath (DE); Reinhardt Winter, Wülfrath (DE); Jan Geraedts, Roggel (NL)

(73) Assignee: ASHLAND-SUDCHEMIE-KERNFEST GMBH, Hilden (DE)

( * ) Notice: Subject to any disclaimer, the term of this patent is extended or adjusted under 35 U.S.C. 154(b) by 336 days.

(21) Appl. No.: 13/989,003

(22) PCT Filed: Nov. 18, 2011

(86) PCT No.: PCT/EP2011/070465
§ 371 (c)(1),
(2), (4) Date: Oct. 4, 2013

(87) PCT Pub. No.: WO2012/066125
PCT Pub. Date: May 24, 2012

(65) Prior Publication Data
US 2014/0060833 A1    Mar. 6, 2014

(30) Foreign Application Priority Data

Nov. 18, 2010 (DE) .......................... 10 2010 051 817

(51) Int. Cl.
*E21B 43/267* (2006.01)
*C09K 8/80* (2006.01)
*C09K 8/62* (2006.01)

(52) U.S. Cl.
CPC . *C09K 8/805* (2013.01); *C09K 8/62* (2013.01); *E21B 43/267* (2013.01)

(58) Field of Classification Search
None
See application file for complete search history.

(56) References Cited

U.S. PATENT DOCUMENTS

| 3,590,902 A | 7/1971 | Walker |
| 4,920,192 A * | 4/1990 | Wiser-Halladay .............. 528/48 |
| 5,048,608 A * | 9/1991 | Wiser-Halladay et al. ... 166/276 |

(Continued)

OTHER PUBLICATIONS

International Search Report, International Application No. PCT/EP2011/070465, mailed Mar. 12, 2012.

(Continued)

*Primary Examiner* — Erma Cameron
(74) *Attorney, Agent, or Firm* — Kagan Binder, PLLC (57) ABSTRACT

The present invention relates to a process for the production of coated proppants, proppants obtainable by such a process, uses thereof and processes using the proppants. The process for the production of coated proppants comprises the following steps: (a) mixing a proppant with a polyol component and an isocyanate component, wherein the polyol component consists of a phenolic resin and optionally one or more other hydroxy group—containing compounds, wherein the isocyanate component consists of an isocyanate having at least 2 isocyanate groups and optionally one or more other isocyanate group—containing compounds, and (b) curing the mixture obtained in step (a) by treatment with a catalyst; and (c) optionally repeating steps (a) and (b) one or more times, wherein the mixture obtained in the preceding step (b) or the proppant isolated therefrom is used as a proppant in step (a), wherein the polyol component in step (a) is the same as or different from the polyol component used in the previous step (a), and wherein the isocyanate component in step (a) is the same as or different from the isocyanate component used in the previous step (a).

34 Claims, 3 Drawing Sheets

(56) References Cited

U.S. PATENT DOCUMENTS

| | | |
|---|---|---|
| 5,244,473 A | 9/1993 | Sardessai |
| 5,981,622 A | 11/1999 | Geoffrey |
| 6,632,527 B1 | 10/2003 | McDaniel et al. |
| 2005/0019574 A1* | 1/2005 | McCrary ................. 428/403 |
| 2008/0236825 A1* | 10/2008 | Barmatov et al. .......... 166/280.1 |
| 2008/0283243 A1* | 11/2008 | Rediger et al. ................ 166/276 |
| 2010/0065271 A1* | 3/2010 | Mccrary et al. ................ 166/278 |
| 2012/0279703 A1* | 11/2012 | McDaniel et al. ......... 166/280.1 |
| 2012/0283153 A1* | 11/2012 | McDaniel et al. ............ 507/219 |
| 2013/0056204 A1* | 3/2013 | McDaniel et al. ......... 166/280.1 |
| 2013/0065800 A1* | 3/2013 | McDaniel et al. ............ 507/219 |
| 2013/0186624 A1* | 7/2013 | McCrary et al. ........... 166/280.1 |

OTHER PUBLICATIONS

International Preliminary Report on Patentability, International Application No. PCT/EP2011/070465, completed Mar. 27, 2013.

* cited by examiner

PROCESS FOR THE PRODUCTION OF COATED PROPPANTS

This application claims benefit from International Application No. PCT/EP2011/070465, which was filed on Nov. 18, 2011, which in turn claims priority to DE 10 2010 051 817.4, which was filed on Nov. 18, 2010, wherein the entireties of said patent applications are incorporated herein by reference.

The present invention relates to a process for the production of coated proppants, proppants obtainable according to this process, uses thereof and processes using the proppants.

In order to improve efficiency during the extraction of crude oil and natural gas, a so-called frac process is employed. By pressing liquid (so-called frac liquid) into the rock layer containing crude oil and natural gas, fractures (fracs) are created.

This frac liquid is usually water gelled with polymers. In order to keep these artificially generated fracs open permanently, solid, more or less spherical materials, such as e.g. ceramic spheres or sand, which are referred to as proppants (support materials), are added to the frac liquid. These proppants are flushed into the frac with the frac liquid. Subsequently, the gel is broken and removed. That way, porous layers are created in the oil- or gas-containing underground which increase the flow and production capacity of the well. The frac process is also used to increase the efficiency of geothermal facilities.

The porous layers have to withstand the pressure of the surrounding rocks and should consistently guarantee a high degree of permeability and porosity. At high flow rates of the occurring oil or gas, there is the additional danger that the proppants are washed out of the artificially generated frac and that the frac closes again. The washed out proppants furthermore impede the transport and processing of the extracted crude oil and natural gas since they are abrasive and can damage or clog valves and pipelines. The washing out of the proppants from the frac is referred to as "flowback".

In order to prevent flowback and to additionally increase the pressure resistance of the proppants, these usually mineral, round or granular materials are often coated with synthetic resins, such as e.g. phenolic resin, epoxy resin, polyurethane phenolic resin, furan resin, etc. Coated proppants and processes for their production are known e.g. from US 200210048676, US 2003/0131998, US 2003/0224165, US 2005/0019574, US 2007/0161515, US 2008/0230223, WO 2010/049467, U.S. Pat. Nos. 4,920,192, 5,048,608 and 5,199,491. By means of special formulations, attempts have been made to achieve a fixation (adhesion) of the proppants in the rock fracture in order to avoid a washing out of the proppants from the frac. This effect is referred to as "flowback control".

The proppants are usually fixed by way of postcuring of the coating. This means that during the coating, storage and introduction of the proppants, the coating resin must not cure completely (b-stage). The coated proppants are free flowing but the coating resin is still slightly thermoplastic. The final curing should not take place until the proppants have been placed in the frac. This curing takes place under the pressure and temperature conditions prevailing therein.

It is extremely difficult to control the degree of curing (b-stage) with the processes commonly used today, such as hot coating. During coating, the curing reaction has to be terminated at the exactly right moment so that postcuring can take place under the pressure and temperature conditions in the frac. Furthermore, unchecked postcuring can also occur during storage and introduction of the proppants into the frac when they are subjected to heat. This is why the adjustment of the flowback control effect only has limited success in those common coating systems.

Furthermore, known coating processes require temperatures of about 80 to 150° C. and mostly flammable solvents. Due to the required complicated equipment such as heatable mixers and facilities for reclaiming solvents or burning exhaust, it is usually not feasible to carry out the coating of the proppants at the drilling location.

It is one of the objects underlying the present invention to provide a process for the production of coated proppants which allows an improved control of the degree of curing of the coating and thus controlled and reproducible postcuring of the coating in the frac and thus allows the adjustment of the flowback control effect.

Another object underlying the present invention is to provide a process for the production of coated proppants which is especially safe and inexpensive and can also be carried out at the drilling location.

These objects are achieved by the present invention which provides a process for the production of a coated proppant comprising the following steps:

(a) mixing a proppant with a polyol component and an isocyanate component,
    wherein the polyol component consists of a phenolic resin and optionally one or more other hydroxy group-containing compounds,
    wherein the isocyanate component consists of an isocyanate having at least 2 isocyanate groups and optionally one or more other isocyanate group-containing compounds, and
    wherein x parts by weight of the isocyanate component are used with respect to 100 parts by weight of the polyol component, with x being about 105% to about 550%, preferably about 105% to about 300%, more preferably about 110% to about 230%, even more preferably about 120% to about 220%, most preferably about 130% to about 200%, of the isocyanate value defined below:

$$\text{isocyanate value} = \frac{42 \cdot 100 \cdot \text{OH content (\%) of the polyol component}}{17 \cdot \text{NCO content (\%) of the isocyanate component}}$$

(b) curing the mixture obtained in step (a) by treatment with a catalyst; and
(c) optionally repeating steps (a) and (b) one or more times,
    wherein the mixture obtained in the preceding step (b) or the proppant isolated therefrom is used as a proppant in step (a),
    wherein the polyol component in step (a) is the same as or different from the polyol component used in the previous step (a), and
    wherein the isocyanate component in step (a) is the same as or different from the isocyanate component used in the previous step (a).

The invention furthermore relates to a coated proppant obtainable by this process as well as uses of the coated proppants and processes using the coated proppants.

The following figures illustrate the invention without restricting it in any way.

The process according to the present invention for the production of coated proppants is described in detail in the following.

Step (a) of the Process for the Production of Coated Proppants

In step (a) of the process according to the present invention, a proppant is mixed with a polyol component and an isocyanate component.

The proppants to be coated are not particularly restricted and can be selected from the proppants known in the art. Examples include sand, ceramic particles (e.g. alumina, silica, titania, zinc oxide, zirconia, ceria, manganese dioxide, iron oxide, calcium oxide or bauxite) or other granular materials. The proppants to be coated preferably have an average particle size of about 50 μm to about 3000 μm, more preferably about 100 μm to about 2000 μm.

The polyol component consists of a phenolic resin and optionally other hydroxyl group-containing compounds.

The phenolic resin is not particularly restricted and can be selected from phenolic resins known in the art. Preferably, the phenolic resin is one or more condensation products of phenols and aldehydes, preferably formaldehyde.

In a preferred embodiment, the phenolic resin is a phenolic resin of the resol or novolak type.

The resol-type phenolic resin is e.g. obtainable by the condensation of phenol or one or more compounds having the following formula (I) with aldehydes, preferably formaldehyde, under basic conditions.

(I)

In formula (I), each R is independently a halogen atom, $C_{1-16}$-alkyl (preferably $C_{1-12}$-alkyl, more preferably $C_{1-6}$-alkyl, most preferably methyl, ethyl, propyl or butyl) or —OH.

In formula (I), p is an integer from 0 to 4, preferably 0, 1, 2 or 3, more preferably 1, 2 or 3, most preferably 1 or 2. If p is 0, the compound according to formula (I) is phenol.

The novolak-type phenolic resin can e.g. be obtained by the condensation of phenol or one or more compounds of the formula (I) defined above with aldehydes, preferably formaldehyde, under acidic conditions.

In another preferred embodiment, the phenolic resin is a benzyl ether resin having the general formula (II):

(II)

In formula (II), A, B and D are each independently a hydrogen atom, a halogen atom, an $C_{1-16}$-hydrocarbon group, —($C_{1-16}$-alkylene)—OH, —OH, an —O—($C_{1-16}$-hydrocarbon group), phenyl, —($C_{1-6}$-alkylene)-phenyl, or —($C_{1-6}$-alkylene)-phenylene-OH.

The halogen atom is e.g. F, Cl, Br or I.

The $C_{1-16}$-hydrocarbon group is preferably $C_{1-16}$-alkyl, $C_{2-16}$-alkenyl or $C_{2-16}$-alkynyl, more preferably $C_{1-12}$-alkyl, $C_{2-12}$-alkenyl or $C_{2-12}$-alkynyl, even more preferably $C_{1-6}$-alkyl, $C_{2-6}$-alkenyl or $C_{2-6}$-alkynyl, even more preferably $C_{1-4}$-alkyl, $C_{2-4}$-alkenyl or $C_{2-4}$-alkynyl, even more preferably $C_{1-12}$-alkyl, even more preferably $C_{1-6}$-alkyl, even more preferably methyl, ethyl, propyl or butyl, and most preferably methyl.

The group —($C_{1-16}$-alkylene)-OH is preferably —($C_{1-12}$-alkylene)-OH, more preferably —($C_{1-6}$-alkylene)-OH, even more preferably —($C_{1-4}$-alkylene)-OH, and most preferably a methylol group (—$CH_2$—OH).

The —O—($C_{1-16}$-hydrocarbon) group is preferably $C_{1-16}$-alkoxy, more preferably $C_{1-12}$-alkoxy, even more preferably $C_{1-6}$-alkoxy, even more preferably $C_{1-4}$-alkoxy, and even more preferably —O—$CH_3$, —O—$CH_2CH_3$, —O—$(CH_2)_2CH_3$ or —O—$(CH_2)_3CH_3$.

The group —($C_{1-6}$-alkylene)-phenyl is preferably —($C_{1-4}$-alkylene)-phenyl, and more preferably —$CH_2$-phenyl.

The group —($C_{1-6}$-alkylene)-phenylene-OH is preferably —($C_{1-4}$-alkylene)-phenylene-OH, and more preferably —$CH_2$-phenylene-OH.

In formula (II), R is a hydrogen atom or a $C_{1-6}$-hydrocarbon group (e.g. linear or branched $C_{1-6}$-alkyl). Preferably, R is a hydrogen atom. This is e.g. the case if formaldehyde is used as an aldehyde component in a condensation reaction with phenols in order to produce the benzyl ether resin of formula (II).

In formula (II), $m^1$ and $m^2$ are each independently 0 or 1.

In formula (II), n is an integer from 0 to 100. Preferably, n is an integer from 1 to 50, more preferably from 2 to 10 and most preferably from 2 to 5.

The sum of n, $m^1$ and $m^2$ is at least 2.

Resols and benzyl ether resins are furthermore heat-reactive. They easily undergo thermal postcuring under the temperature and pressure conditions in the frac, adhere the proppants and thus contribute to the flowback control.

In yet another embodiment, the phenolic resin can comprise monomer units on the basis of cardol and/or cardanol.

Cardol and cardanol are prepared from cashew nut oil which is obtained from the seeds of the cashew tree. Cashew nut oil consists of about 90% anacardic acid and about 10% cardol. A heat treatment in an acidic environment results in a mixture of cardol and cardanol due to the decarboxylation of the anacardic acid.

Cardol and cardanol have the structures shown below:

n = 0, 2, 4, 6
Cardanol n = 0, 2, 4, 6
Cardol

As shown in the above illustration, the hydrocarbon group (—$C_{15}H_{31-n}$) in cardol or cardanol can comprise one (n=2), two (n=4) or three (n=6) double bonds. Cardol particularly refers to the compound having the CAS number 57486-25-6, and cardanol particularly refers to the compound having the CAS number 37330-39-5.

Cardol and cardanol can each be used alone or together, at any mixing ratios, in the phenolic resin. Decarboxylated cashew nut oil can also be used.

Cardol and/or cardanol can be condensed into the phenolic resins described above, e.g. phenolic resins of the resol- or novolak-type. To this end, cardol and/or cardanol can be condensed e.g. with phenol or one or more of the compounds having the formula (I) as described above, as well as with aldehydes, preferably formaldehyde.

The amount of cardol and/or cardanol condensed into the phenolic resin is not particularly restricted and is preferably about 1 wt.-% to about 99 wt.-%, more preferably about 5 wt.-% to about 60 wt.-%, even more preferably about 10 wt.-% to about 30 wt.-%, based on 100 wt.-% of the phenolic educt used in the phenolic resin.

In another embodiment, the phenolic resin is a phenolic resin obtainable by the condensation of cardol and/or cardanol with an aldehyde, preferably formaldehyde.

A phenolic resin which comprises monomer units based on cardol and/or cardanol as described above or which is obtainable by condensing cardol and/or cardanol and an aldehyde, has an especially low viscosity and can therefore preferably be used with little or no addition of reactive diluent. Furthermore, such a long-chain substituted phenolic resin is comparatively hydrophobic which results in an advantageous shelf life of the coated proppants obtainable by the process according to the present invention as well as in an advantageous low flowback tendency of the coated proppants in the frac. Moreover, such a phenolic resin is also advantageous because cardol and cardanol are renewable resources.

In addition to the phenolic resin, the polyol component can also comprise other hydroxy group-containing compounds.

The other hydroxy group-containing compounds are not particularly restricted and can be selected from hydroxy group-containing compounds known in the art of polyurethane chemistry.

The optionally present other hydroxy group-containing compounds can e.g. be hydroxy-functional polyethers, hydroxy-functional polyesters, alcohols or glycols. A preferred hydroxy group-containing compound is e.g. castor oil. Hydroxy group-containing compounds such as e.g. alcohols or glycols, in particular cardol and/or cardanol, can be used as reactive diluents.

The amount of other hydroxy group-containing compounds depends on the desired properties of the proppant coating and can be selected accordingly by the person skilled in the art. Typical amounts of hydroxy group-containing compounds fall in the range of about 10 wt.-% to about 80 wt.-%, preferably about 20 wt.-% to about 70 wt.-%, based on 100 wt.-% of the polyol component.

The isocyanate component consists of an isocyanate having at least 2 isocyanate groups and optionally other isocyanate group-containing compounds.

The isocyanate having at least 2 isocyanate groups is not particularly restricted and can be selected from the isocyanate groups known in the art.

Preferably, an aliphatic or aromatic isocyanate having at least 2 isocyanate groups (e.g. a diisocyanate, triisocyanate or tetraisocyanate), or an oligomer or a polymer thereof can be used as an isocyanate having at least 2 isocyanate groups. These isocyanates having at least 2 isocyanate groups can also be carbocyclic or heterocyclic and/or comprise one or more heterocyclic groups.

The isocyanate having at least 2 isocyanate groups is preferably a compound having the formula (III) or a compound having the formula (IV):

In formulae (III) and (IV), each A is independently aryl, heteroaryl, cycloalkyl or heterocycloalkyl. Preferably, each A is independently aryl or cycloalkyl. More preferably, each A is independently aryl. Even more preferably, each A is phenyl.

The aryl is preferably phenyl, naphthyl or anthracenyl, more preferably phenyl.

The heteroaryl is preferably a heteroaryl having 5 or 6 ring atoms, 1, 2, or 3 of which are independently an oxygen, sulfur or nitrogen atom and the remaining ring atoms are carbon atoms. More preferably, the heteroaryl is selected from pyridinyl, thienyl, furyl, pyrrolyl, imidazolyl, pyrazolyl, pyrazinyl, pyrimidinyl, pyridazinyl, oxazolyl, isoxazolyl or furazanyl.

The cycloalkyl is preferably a $C_{3-10}$-cycloalkyl, more preferably a $C_{5-7}$-cycloalkyl.

The heterocycloalkyl is preferably a heterocycloalkyl having 3 to 10 ring atoms (more preferably 5 to 7 ring atoms), one or more of which (e.g. 1, 2 or 3) are each independently an oxygen, sulfur or nitrogen atom and the remaining ring atoms are carbon atoms. More preferably, the heterocycloalkyl is selected from tetrahydrofuranyl, piperidinyl, piperazinyl, aziridinyl, azetidinyl, pyrrolidinyl, imidazolidinyl, morpholinyl, pyrazolidinyl, tetrahydrothienyl, octahydroquinolinyl, octahydroisoquinolinyl, oxazolidinyl or isoxazolidinyl. Even more preferably, the heterocycloalkyl is selected from tetrahydrofuranyl, piperidinyl, piperazinyl, pyrrolidinyl, imidazolidinyl, morpholinyl, pyrazolidinyl, tetrahydrothienyl, oxazolidinyl or isoxazolidinyl.

In formulae (III) and (IV), each $R^1$ is independently a covalent bond or $C_{1-4}$-alkylene (e.g. methylene, ethylene, propylene or butylene). Preferably, each $R^2$ is a covalent bond.

In formulae (III) and (IV), each $R^2$ is independently halogen (e.g. F, Cl, Br or I), $C_{1-4}$-alkyl (e.g. methyl, ethyl, propyl or butyl) or $C_{1-4}$-alkyoxy (e.g. methoxy, ethoxy, propoxy or butoxy). Preferably, each $R^2$ is independently a $C_{1-4}$-alkyl. More preferably, each $R^2$ is methyl.

In formula (IV), $R^3$ is a covalent bond, a $C_{1-4}$-alkylene (e.g. methylene, ethylene, propylene or butylene) or a group —$(CH_2)_{R31}$—O—$(CH_2)_{R32}$—, wherein R31 and R32 are each independently 0, 1, 2 or 3. Preferably, $R^3$ is a group —$CH_2$— or a group —O—.

In formula (III), p is 2, 3 or 4, preferably 2 or 3, more preferably 2.

In formulae (III) and (IV), each q is independently an integer from 0 to 3, preferably 0, 1 or 2. If q is 0, the corresponding group A does not have a substituent $R^2$, i.e. instead of $R^2$ it has hydrogen atoms.

In formula (IV), r and s are each independently 0, 1, 2, 3 or 4, wherein the sum of r and s is 2, 3 or 4. Preferably, r and s are wherein the polyol component in step (a) is the same as or different from the polyol component used in the previous step (a), and wherein the isocyanate compoeach independently 0, 1 or 2, wherein the sum of r and s is 2. More preferably, r is 1 and s is 1.

Examples of the isocyanate having at least 2 isocyanate groups include:

Toluene-2,4-diisocyanate, toluene-2,6-diisocyanate, 1,5-naphthalene diisocyanate, cumene-2,4-diisocyanate, 4-methoxy-1,3-phenyl diisocyanate, 4-chloro-1,3-phenyl diisocyanate, diphenylmethane-4,4-diisocyanate, diphenylmethane-2,4-diisocyanate, diphenylmethane-2,2-diisocyanate, 4-bromo-1,3-phenyl diisocyanate, 4-ethoxy-1,3-phenyl diisocyanate, 2,4'-diisocyanate-diphenylether, 5,6-dimethyl-1,3-phenyl diisocyanate, 2,4-dimethyl-1,3-phenyl diisocyanate, 4,4-diisocyanatodiphenylether, 4,6-dimethyl-1,3-phenyl diisocyanate, 9,10-anthracene diisocyanate, 2,4,6-toluene triisocyanate, 2,4,4'-triisocyanatodiphenylether, 1,4-tetramethylene diisocyanate, 1,6-hexamethylene diisocyanate, 1,10-decamethylene diisocyanate, 1,3-cyclohexylene diisocyanate, 4,4'-methylene-bis-(cyclohexylisocyanate), xylene diisocyanate, 1-isocyanato-3-methylisocyanate-3,5,5-trimethylcyclohexane (isophorone diisocyanate), 1-3-bis(isocyanato-1-methylethyl)-benzene (m-TMXDI), 1,4-bis(isocyanato-1-methylethyl)-benzene (p-TMXDI), oligomers or polymers of the above-mentioned isocyanate compounds, or mixtures of two or more of the above-mentioned isocyanate compounds or oligomers or polymers thereof.

The isocyanate having at least 2 isocyanate groups is more preferably toluene diisocyanate, diphenylmethane diisocyanate, an oligomer on the basis of toluene diisocyanate or an oligomer on the basis of diphenylmethane diisocyanate.

According to the present invention, the proppants to be coated are treated with an excess of isocyanate component compared to the polyol component. Therefore, in step (a), x parts by weight of the isocyanate component are used with respect to 100 parts by weight of the polyol component. x equals about 105% to about 550%, preferably about 105% to about 300%, more preferably about 110% to about 230%, even more preferably about 120% to about 220%, most preferably about 130% to about 200%, of the isocyanate value defined below (i.e. x is a number which is about 105% to about 550%, preferably about 105% to about 300%, more preferably about 110% to about 230%, even more preferably about 120% to about 220%, most preferably about 130% to about 200%, of the isocyanate value defined below):

$$\text{isocyanate value} = \frac{42 \cdot 100 \cdot \text{OH content (\%) of the polyol component}}{17 \cdot \text{NCO content (\%) of the isocyanate component}}$$

The isocyanate value defines the amount of isocyanate component which is equivalent to 100 parts by weight of the polyol component. The NCO content (%) of the isocyanate component is determined according to DIN ISO 53185. For determining the OH content (%) of the polyol component, at first the so-called OH number is determined according to DIN ISO 53240 as mg KOH/g, and this value is divided by 33 in order to calculate the OH content.

Thus, in step (a), an excess of NCO groups in the isocyanate component of about 5 to about 450%, preferably about 5 to about 200%, more preferably about 10 to about 130%, more preferably about 20% to about 120%, even more preferably about 30% to about 100%, based on the OH groups in the polyol component is used (corresponds to the above-mentioned amount of the isocyanate of about 105% to about 550%, preferably about 105% to about 300%, more preferably about 110% to about 230%, even more preferably about 120% to about 220%, most preferably about 130% to about 200%, of the isocyanate value).

It is essential for the process for coating proppants according to the present invention that an excess of isocyanate component compared to the polyol component be used, as described above, so that a reduction in the undesired flowback effect can be achieved.

Due to the excess of an isocyanate component in step (a) of the process according to the present invention, the coated proppants obtainable by this process comprise an amount of free isocyanate groups in the coating. This allows for controlled postcuring of the coating in the frac as the free terminal isocyanate groups of the coating react with water present in the frac under the prevailing temperature and pressure conditions, whereby (poly-)urea structures are formed. It is assumed that the isocyanate groups react with water to form amino groups, whereby $CO_2$ is released, which amino groups then react with other free isocyanate groups in the coating to form urea structures. Due to the postcuring of the coating in the frac, the proppants adhere and a porous, pressure-resistant, stable layer having a high degree of permeability is formed. Thus, the flowback effect can be reduced.

A higher excess of isocyanate component usually results in softer coatings and superior flowback control properties. Thus, by modifying the mixing ratio of isocyanate component and polyol component, the properties of the proppant coating can be largely adapted to the desired specific demands.

Furthermore, one or more additives can be mixed with the proppant, the polyol component and the isocyanate component in step (a).

These additives are not particularly restricted and can be selected from the additives known in the art.

If any of these additives comprises a hydroxy group, it has to be considered another hydroxy group-containing compound as described above in connection with the polyol component. If any of these additives comprises an isocyanate group, it has to be considered another isocyanate group-containing compound. Additives having hydroxy groups and isocyanate groups can be simultaneously considered other hydroxy group-containing and other isocyanate group-containing compounds.

Solvents, plasticizers, wetting agents, molecular sieves for removing reaction water, diluents, and/or adhesion promotors (such as silanes) can e.g. be used as additives.

Silanes, in particular, can be used to improve the adhesion of the coating resin to the proppant. Silanes can be added in step (a) as an additive, but they can also be chemically reacted with the reactive constituents of the polyol component or the isocyanate component. Functional silanes, such as e.g. aminosilanes, epoxy-, aryl- or vinylsilanes, are commercially available and can be used as an additive, as described above, or reacted with the reactive constituents of the polyol component or the isocyanate component. Aminosilanes and epoxysilanes in particular can be easily reacted with the isocyanate component.

The process for the production of coated proppants according to the present invention can be carried out without the use of solvents. Accordingly, in one embodiment of the process, the mixture obtained in step (a) is solvent-free or substantially solvent-free. The mixture is substantially solvent-free if it contains less than 20 wt.-%, preferably less than 10 wt.-%, more preferably less than 5 wt.-%, even more preferably less than 3 wt.-%, and even more preferably less than 1 wt.-% of solvent, based on the total weight of the components of the mixture.

Preferably, the process is carried out without the use of organic solvents. In this case, the mixture obtained in step (a) is free or substantially free of organic solvents. The mixture is substantially free of organic solvents if it contains less than 20 wt.-%, preferably less than 10 wt.-%, more preferably less than 5 wt.-%, even more preferably less than 3 wt.-%, and even more preferably less than 1 wt.-% of organic solvents, based on the total weight of the components of the mixture.

In step (a), proppants, polyol component, isocyanate component and optional additives can be mixed using any desired process.

A mixer can be used for this purpose which is not particularly restricted and can be selected from mixers known in the art. For example, a kneader mixer or a stirrer mixer can be used. For example, a drum mixer, a pan mixer, an in-line mixer, a trough mixer or a cone mixer can be used. The easiest mixing process employs a rotating drum. A screw can, for example, be used as a continuous mixer.

Mixing can be carried out as a continuous or a discontinuous process. In suitable mixers it is, for example, possible to continuously add the polyol component, the isocyanate component and optional additives to the proppants and at the same time to treat the mixture with a catalyst as described in step (b), preferably to introduce the catalyst as a gas. For example, the polyol component, the isocyanate component and the optional additives can be mixed in a continuous mixer (such as a screw) with the proppants and an amine (e.g. an amine/air mixture or a nitrogen/amine mixture as described below) can be introduced.

Preferably, the proppants, polyol components, isocyanate components and the optional additives are mixed homogenously. Thus, the polyol component and the isocyanate component are evenly distributed on the surface of the proppants. Preferably, the proppant, polyol component, isocyanate component and optional additives are agitated during the entire mixing process.

It is also possible to connect several mixers in series or to coat the proppants in several passes through a single mixer.

The temperature at which step (a) is carried out is not particularly restricted. Preferably, step (a) is carried out at the same temperature as step (b), e.g. at a temperature of about 10° C. to about 50° C., more preferably at a temperature of about 10° C. to about 40° C.

Step (b) of the Process for the Production of Coated Proppants

In step (b), the mixture obtained in step (a) is treated with a catalyst and thus cured.

The catalyst is not particularly restricted and can be selected from the catalysts known in the art which catalyze the reaction of hydroxy group-containing compounds and isocyanate group-containing compounds to form (poly-)urethanes. Suitable catalysts can, for example, be selected from nitrogen-containing compounds, organometallic compounds (in particular from organotin, organoiron, organobismuth or organomercury compounds) or combinations thereof. The organometallic compounds are preferably used in combination with one or more amines, e.g. the amines described below.

Preferably, an amine, an organotin compound or a combination thereof is used as a catalyst.

The amine is preferably a tertiary amine and more preferably a compound having the formula $(R)_3N$, wherein each R is independently a $(C_{1-6})$-hydrocarbon group which is optionally substituted with one or more hydroxy groups. Preferably, each R is independently a $(C_{1-4})$-alkyl, a $(C_{2-4})$-alkenyl or a $(C_{2-4})$-alkynyl, wherein the alkyl, alkenyl or alkynyl is optionally substituted with one or more hydroxy groups. More preferably, each R is independently $(C_{1-4})$-alkyl which is optionally substituted with a hydroxy group. Trimethylamine, triethylamine, dimethylethylamine, dimethylisopropylamine, dimethylpropylamine, triethanolamine, vinylimidazole, 1,4-diazabicyclo[2.2.2]octane (DABCO) or a mixture thereof are particularly preferred as a catalyst.

The organotin compound is not particularly restricted and can be selected from the organotin compounds known in the art of polyurethane chemistry. The organotin compound is preferably used in combination with one or more amines, such as e.g. the amines described above. Preferably, the organotin compound is a compound having the formula $(R^1)_2Sn(R^2)_2$, wherein each $R^1$ is independently a $(C_{1-20})$-hydrocarbon-carbonyloxy group and each $R^2$ is independently a $(C_{1-8})$-hydrocarbon group. Preferably, each $R^1$ is independently a $(C_{1-20})$-alkyl-carbonyloxy group, a $(C_{2-20})$-alkenyl-carbonyloxy group or a $(C_{2-20})$-alkynyl-carbonyloxy group. More preferably, each $R^1$ is independently a $(C_{9-13})$-alkyl-carbonyloxy group. Each $R^2$ is preferably independently a $(C_{1-8})$-alkyl, a $(C_{2-8})$-alkenyl or a $(C_{2-8})$-alkynyl, more preferably, each $R^2$ is independently a $(C_{2-6})$-alkyl. Accordingly, dibutyltin dilaurate can, for example, preferably be used as a catalyst. Preferably, the mixture obtained in step (a) is supplied with a gaseous catalyst in step (b). A mixture of a carrier gas (e.g. nitrogen or air) and one of the catalysts described above can, for example, be used as a gaseous catalyst. For this purpose, the carrier gas, such as nitrogen or air, can, for example, be passed through a catalyst present in a liquid state. Preferably, a nitrogen/amine mixture or an air/amine mixture is used as a gaseous catalyst, wherein the amine contained in the nitrogen/amine mixture or the air/amine mixture is, for example, a low-boiling amine (preferably an amine boiling at a temperature of 90° C. or less, more preferably 70° C. or less, even more preferably 40° C. or less). For example trimethylamine, triethylamine, dimethylethylamine, dimethylpropylamine, dimethylisopropylamine or at mixture thereof are particularly preferred. The amine used as a gaseous catalyst can be collected e.g. using an acid scrubber. The air in the air/amine mixture is preferably dry air, more preferably anhydrous air.

The reaction time in step (b) is not particularly restricted and depends on the type and amount of catalyst used therein. When supplying a gaseous catalyst, in some embodiments a reaction time of less than 1 minute can be selected.

The treatment with a catalyst in step (b) is carried out such that curing occurs due to the reaction of the isocyanate component and the polyol component, resulting in the formation of polyurethane structures. In order to ensure postcuring of the coating in the frac and hence a reduction of the flowback effect, the free isocyanate groups in step (b) must not react with water and form urea structures. Thus, only partial curing is carried out in step (b).

The curing conditions in step (b) can be adjusted by a person skilled in the art in different ways such that hardly any or no reaction of the isocyanate groups with water in which urea structures are formed takes place. In a preferred embodiment, this is, for example, accomplished by carrying out the curing in step (b) at a temperature of about 10° C. to about 60° C., preferably from about 10° C. to about 55° C., more preferably from about 10° C. to about 40° C. If the value x is in the range of about 105% to about 550%, preferably about 105% to about 300%, more preferably about 110% to about 230%, even more preferably about 120% to about 220%, and even more preferably about 130% to about 200%, the temperature is preferably from about 10° C. to about 55° C., more preferably from about 10° C. to about 40° C. If the value x is in the range of about 300% to about 550%, the temperature is preferably from about 40° C. to about 60° C., more preferably from about 40° C. to about 55° C. By choosing the temperature in this range, adhesion of the proppants during curing can be prevented. Due to the high x value, increased pressure resistance values are obtained when the coated proppants are used.

During curing in step (b), the pressure can be about 50 to about 200 kPa, preferably about 100 to about 150 kPa (e.g. at a standard pressure of about 101.3 kPa).

In another preferred embodiment, the curing in step (b) can, for example, be carried out under the exclusion of water or at a low water content. Hence, there is hardly any reaction of the isocyanate groups with water to form urea structures, either. In this case, the water content of the mixture obtained in step (a) is preferably less than 10 wt.-%, more preferably less than 5 wt.-%, even more preferably less than 2 wt.-%, even more preferably less than 1 wt.-%, even more preferably less than 0.5 wt.-%, even more preferably less than 0.2 wt.-%, based on the total weight of the mixture as 100 wt.-%. Such a low water content can, for example, be achieved by using the educts in step (a)—proppants, polyol component, isocyanate component and optional additives—in dried form, preferably in anhydrous form. Furthermore, as was described above, a gaseous catalyst in the form of a nitrogen/amine mixture or an air/amine mixture can be used, wherein the air in the air/amine mixture is preferably dry air, more preferred anhydrous air.

The curing in step (b) can also be carried out under the exclusion of water or at a low water content, as described above, and furthermore at a temperature of about 10° C. to about 50° C., preferably from about 10° C. to about 40° C., as well as a pressure of about 50 to about 200 kPa, preferably about 100 to about 150 kPa (e.g. at a standard pressure of about 101.3 kPa).

Furthermore, by using an amine as described above as the catalyst in step (b), it can be ensured that during curing in step (b) hardly any reaction of the isocyanate groups with water which results in the formation of urea structures takes place. Amines mainly catalyze in the reaction of aromatic hydroxy groups and isocyanate groups and, in comparison, only to a very limited degree the reaction of water and isocyanate groups.

Step (b) results in a mixture comprising coated proppants. Depending on the processing conditions and especially the mixing conditions selected during steps (a) and (b), in addition to coated individual particles, the mixture can also comprise aggregates which consist of several proppants adhering to each other via their coating. Under appropriate mixing conditions, the amount of aggregates usually accounts for at most 10 wt.-%, preferably at most 5 wt.-%, more preferably at most 1 wt.-%, based on the weight of the mixture. If desired, the aggregates can be removed from the mixture prior to the use of the coated proppants or before step (c). The person skilled in the art is familiar with suitable processes such as, for example, sieving, classification and sizing, each optionally in combination with a preceding milling process.

Step (c) of the Process for the Production of Coated Proppants

Step (c) is optional. During step (c), the previous steps (a) and (b) are optionally repeated one or more times (e.g. 1-5 times, 2-4 times or 2-3 times), i.e. the coated and cured proppant obtained in step (b) is again mixed with a polyol component and an isocyanate component and the mixture is treated with a catalyst and thus cured. Thus, the thickness of the coating of the proppants can be adjusted.

In step (c), either the cured mixture obtained in step (b) can be used directly (i.e. the mixture obtained in step (b) can be mixed directly with the polyol component and the isocyanate component and subsequently treated with a catalyst), or only the coated and cured proppants (i.e. without aggregates) are used, in which case they are isolated from the mixture obtained in step (b) and optionally cleaned.

In the single or repeated repetition of steps (a) and (b), the same or a different polyol component as that used in the previous step (a) can be used as a polyol component in step (a). Likewise, the same or a different isocyanate component as that used in the previous step (a) can be used as an isocyanate component in step (a). Furthermore, when steps (a) and (b) are repeated, the amounts of polyol component and/or isocyanate component can be modified.

In particular when the application weight of the coating resin is high, it is recommended to carry out a step-wise coating process by repeating steps (a) and (b) one or more times as described above, in order to avoid adhesion or agglomeration of the proppants during the coating process.

The amount of coating resin, i.e. the polyurethane resin applied to a proppant, is preferably about 0.5 to about 10 wt.-%, more preferably about 2 to about 5 wt.-%, of resin, based on the weight of the proppant as 100 wt.-%.

From step (c), a mixture is obtained which comprises coated proppants. Depending on the processing conditions and in particular the mixing conditions selected during the repeated steps (a) and (b), in addition to coated individual particles, the mixture can also comprise aggregates which consist of several proppants adhering to each other via their coating. Under appropriate mixing conditions, the amount of aggregates usually accounts for at most 10 wt.-%, preferably at most 5 wt.-%, more preferably at most 1 wt.-%, based on the weight of the mixture. If desired, the aggregates can be removed from the mixture after step (c). The person skilled in the art is familiar with suitable processes such as for example sieving, classification and sizing, each optionally in combination with a preceding milling process.

The coated proppants obtained by the process according to the present invention are present in particulate form. The individual particles usually comprise 1 to 5 proppant particles, preferably 1 to 3 proppant particles, more preferably 1 or 2 proppant particles, most preferably 1 proppant particle which are/is covered by the coating. The amount of aggregates (i.e. particles comprising more than one proppant particle) usually accounts for at most 10 wt.-%, preferably at most 5 wt.-%, more preferably at most 1 wt.-%, based on the weight of the mixture. The coated proppants are usually present in free flowing form. Due to the particulate structure and the preferred free flowing form, the coated proppant are especially easy to handle during further processing and their use in the frac.

The coated proppants according to the present invention, which can be obtained by the process provided herein, exhibit an amount of free isocyanate groups in the coating. Without wanting to be restricted to a specific theory, it is assumed that the free isocyanate groups are embedded in the resin matrix of the coating and are only partially present at the surface of the coated proppants. It is therefore believed that during storage and during the introduction into a frac, hardly any reaction of the isocyanate groups takes place. A substantial amount of reaction and thus postcuring only occurs under the elevated temperature and pressure conditions in the frac. The coated proppants according to the present invention are characterized by a good shelf life and they can therefore also be easily brought to the drilling location as a pre-coated material.

In addition, the coated proppants can be treated with wetting agents or auxiliary agents such as e.g. talcum or stearate, in order to improve their free flowing properties.

The present invention furthermore relates to a frac liquid comprising the coated proppants according to the present invention. Accordingly, the invention includes the use of the coated proppants in the production of crude oil or natural gas.

The frac liquid is not particularly restricted and can be selected from the frac liquids known in the art. Suitable frac liquids are, for example, described in "W C Lyons, G J Plisga: Standard handbook of petroleum and natural gas engineering; Gulf Professional Publishing; 2005". The frac liquid can, for example, comprise water gelled with polymer, an oil-in-water emulsion gelled with polymer or a water-in-oil emulsion gelled with polymer. In a preferred embodiment, the frac liquid comprises the following components in the ratios given below: 1000 l water; 20 kg potassium chloride; 0.120 kg sodium acetate; 3.6 kg guar gum (water-soluble polymer); sodium hydroxide (as needed) for adjusting the pH value to 9 to 11; 0.120 kg sodium thiosulfate; and 0.180 kg ammonium persulfate.

The invention furthermore relates to a process for the production of crude oil or natural gas comprising injecting the coated proppants in a frac liquid (i.e. injecting a frac liquid which contains the coated proppants) into a rock layer containing crude oil or natural gas, or introducing the proppants into a frac in the rock layer containing crude oil or natural gas. The process is not particularly restricted and can be carried out in a manner known in the art.

Following the introduction of the coated proppants, a frac is formed in the rock layer containing crude oil or natural gas, and the coated proppants of the present invention undergo postcuring in the frac in the presence of water. The free terminal isocyanate groups of the coated proppants react with water present in the frac under the prevailing temperature and pressure conditions, whereby urea structures are formed. It is assumed that the isocyanate groups react with water to form amino groups, whereby $CO_2$ is released, which amino groups then react with other free isocyanate groups in the coated proppants to form urea structures. The conditions under which the postcuring takes place can vary widely depending on the rock layer. Typical conditions are, for example, a pressure in the range of about 690 to about 34,500 kPa and a temperature in the range of about 50 to about 250° C. The postcuring of the coated proppants in the frac results in a porous, pressure-resistant, stable layer having a high degree of permeability. The individual particles adhere to each other. Thus, a reduction in the flowback effect can be achieved.

After postcuring in the frac, the coated proppants preferably comprise less than 90%, more preferably less than 80%, even more preferably less than 70%, even more preferably less than 60%, and even more preferably less than 50%, of the amount of free isocyanate groups present in the coating prior to the introduction of the proppants.

The coated proppants according to the present invention, which are obtainable by the process described herein, are therefore advantageous because they allow postcuring and thus adhesion of the proppants under the conditions prevailing in the frac, as is shown in Example 8 as well, which allows the reduction of the undesired flowback effect.

The coating process according to the present invention is furthermore advantageous with respect to safety and cost efficiency because it can be carried out at low temperatures of for example about 10° C. to about 50° C. and furthermore without the use of solvents, while known processes are typically carried out at high temperatures and mostly use organic solvents.

By means of the process according to the present invention, proppants can be coated quickly, safely, at low temperatures of from about 10 to about 50° C. and optionally solvent-free. The flowback control effect can be controlled and reproducibly adjusted. The coating process does not require special equipment and can optionally also be executed at short notice near the drilling location.

To sum up, the process according to the present invention exhibits the following advantages compared to the prior art:
1. particulate product;
2. free flowing product;
3. the coated proppants do not tend to adhere;
4. simple, cold, optionally solvent-free coating process;
5. flowback control effect can be adjusted in a reproducible manner;
6. no contamination of the water by monomer constituents such as phenol;
7. good storage stability of the components of the coating resin and the coated proppants;
8. no impact on the properties of the gel and gel breakdown due to the neutral pH value of the coating; and
9. homogenous, crack free coating of the proppants since the curing reaction in step (b) is a polyaddition in which no gaseous products are released.

The term "comprise" used herein (as well as "contain") is intended to mean that the mentioned components are comprised or contained, inter alia, while other components, which are not mentioned, may be contained as well. However, the term "comprise" (and/or "contain") also encompasses the meaning of "consisting of", i.e. the possibility that only the mentioned components are contained, without any other, undisclosed, components being present.

The term "about" used herein indicates that a slight deviation from the given value is possible. Unless defined otherwise, the term "about" refers to a possible deviation of ±10%, preferably ±5%, more preferably ±2%, even more preferably ±1%, of the given value. The given value itself is most preferred.

The examples below are intended to explain the present invention in more detail without restricting it in any way.

EXAMPLES

Example 1

Preparation of the Phenolic Resin Component
Phenolic Resin 1a

In a reaction flask, 412 g phenol, 48.8 g decarboxylated cashew nut oil (Cardolite NC-700; Cardolite, Newark N.J.; mixture of cardol and cardanol), 198 g paraformaldehyde and 0.5 g zinc acetate were mixed, refluxed at 115° C. and held at this temperature for one hour. The resulting reaction water was then distilled off with the help of a vacuum. The yield was about 85%.

Phenolic Resin 1b

In a reaction flask, 349 g phenol, 401.5 g ortho-cresol, 135 g of a 37% formaldehyde solution, 110.2 g paraformaldehyde and 3.5 g oxalic acid were mixed, refluxed at about 100° C. and held at this temperature for four hours. The resulting water was then distilled off with the help of a vacuum until the product temperature reached 160° C. The yield was about 80%.

Phenolic Resin 1c

In a reaction flask, 661 g phenol, 339 g paraformaldehyde and 0.5 g zinc acetate were mixed, refluxed at 119 to 121° C. and held at this temperature for two hours. The resulting reaction water was then distilled off with the help of a vacuum. The yield was about 85%.

Example 2

Formulation of the Polyol Component

| Formulation (wt.-%) | A | B | C | D |
|---|---|---|---|---|
| Phenolic resin Example 1a | 40.0 | 38.3 | | |
| Phenolic resin Example 1b | | | 41.0 | |
| Phenolic resin Example 1c | | | | 42.0 |
| Castor oil | 41.0 | | | |
| Polyether polyol* | | 38.4 | 33.4 | 32.7 |
| Diethylene glycol | 8.0 | | | |
| Cardol/Cardanol** | 10.7 | 23 | | |
| Polyfunctional alcohol*** | | | 15.3 | 15.0 |
| Amino diluent**** | | | | 10.0 |
| Mercapto diluent***** | | | 10.0 | |
| Aminosilane****** | 0.3 | 0.3 | 0.3 | 0.3 |
| OH-content (%) | 11.56 | 11.51 | 15.82 | 16.09 |

*low viscosity polyether polyol, viscosity: 600 mPa · s at 25° C., OH number: 385 mg KOH/g (Desmophen 1380 BT, Bayer Material Science)
**Cardolite NC-700 (mixture of cardol and cardanol, contains about 10 wt.-% cardol and about 90 wt.-% cardanol)
***Modified 5-ethyl-5-hydroxymethyldioxane, viscosity: 150 mPa · s at 25° C., OH number: 800 mg KOH/g (Polyol TD, Perstorp Specialty Chemicals AB)
****Aminofunctional reaction partner for isocyanate, viscosity: 100 mPa · s at 25° C., amine value: 245 mg KOH/g (Desmophen NH 1220, Bayer Material Science)
*****Pentaerythrol tetra-3-mercaptopropionate (Thiocure PETMP, Brono Boch, Tio-Chemicals)
******Ureidopropyl triethoxysilane (Dynasylan 2201 EQ, Evonik Industries)

Example 3

Preparation of the Isocyanate Component

The isocyanate component consists of a mixture of oligomers on the basis of diphenylmethane diisocyanate with a functionality of about 2.7 (Voranate M 229, Dow). According to manufacturer's specifications, Voranate M 229 has an NCO content of 29 to 33%. The charge used had an NCO content of 31.8%.

Example 4

Coating the Proppants

Commercially available proppants, Carbolite 16/20 (Carbo Ceramics Inc.), were used as the starting material. In batches 1 to 8, coating was carried out in a rotating metal bowl with scraper at 23° C. The proppants were agitated during the entire coating process. The polyol component A or B of Example 2 and the isocyanate component of Example 3 were pre-mixed and added to the proppants. After the resin mixture had been evenly distributed on the proppants, the coating material was cured by introducing gaseous triethylamine.

In Example 9 the uncoated proppants were preheated at a temperature of 60° C. and then placed in the mixer. They were mixed without the addition of other components until their temperature was 50° C. Then the components of the coating were added and the coating was cured as described above. The temperature was maintained at 50° C. during the coating.

The total amount of coating material (resin amount) was 2 to 5 wt.-%, based on the weight of the proppants (see table below). This amount of resin was applied in 2 to 5 cycles in order to avoid caking or adhesion of the proppants.

In the test batches listed in the table below, 1 wt.-% resin mixture was added per coating cycle.

| Batch | Polyol component | Amount of resin | Number of coating cycles | Isocyanate (wt.-%)/ Polyol (wt.-%) |
|---|---|---|---|---|
| 1 | A | 4 wt.-% | 4 | 50:50 |
| 2 | B | 4 wt.-% | 4 | 50:50 |
| 3 | B | 4 wt.-% | 4 | 60:40 |
| 4* | B | 4 wt.-% | 4 | 40:60 |
| 5 | B | 5 wt.-% | 5 | 2x 70:30 3x 60:40 |
| 6 | B | 4 wt.-% | 4 | 2x 70:30 2x 60:40 |
| 7 | B | 3 wt.-% | 3 | 1x 70:30 2x 60:40 |
| 8 | B | 2 wt.-% | 2 | 1x 70:30 1x 60:40 |
| 9 | B | 3 wt.-% | 3 | 80:20 |

(*Comparative Example)

Example 5

Strength of the Coated Proppants

In order to be able to draw conclusions as to the flowback effect, the strength ("unconfined compressive strength", UCS) of the coated proppants of Example 4 was determined.

For this purpose, 30 g of the coated proppants of Example 4 were placed in a cylindrical test cell having a diameter of 2.54 cm and a length of 3.81 cm. At the bottom, the cylinder was closed with a steel sieve which allows liquid to pass. Pressure was applied to the proppants from above by means of a movable piston. At the same time, the proppant pack was flushed with a 2% KCl solution to simulate sea water. The piston pressure to the proppants was increased to 6895 kPa at a rate of 689.5 kPa/min. The samples were held for 24 hours at a temperature of 120° C. and a pressure of 6895 kPa and continuously flushed with the KCl solution.

After 24 hours, the cylindrical test samples of resin-bonded proppants were cooled to room temperature, removed and measured. Then, the pressure resistance of the proppants was determined in a hydraulic press.

| | Sample (batch no.) | | | | | | | | |
|---|---|---|---|---|---|---|---|---|---|
| | 1 | 2 | 3 | 4 | 5 | 6 | 7 | 8 | 9 |
| Strength (psi) | 255 | 437 | 480 | 274 | 683 | 490 | 251 | 98 | 245 |
| Strength (kPa) | 1758 | 3013 | 3309 | 1889 | 4709 | 3378 | 1731 | 676 | 1690 |

The high strength values observed in these samples imply favorable flowback control properties of the proppants coated according to the present invention.

Example 6

Conductivity of the Coated Proppants

The coated proppants are intended to provide underground layers having a high conductivity for gas and oil. The measurement of the conductivity under pressure and thermal load was carried out according to DIN EN ISO 13503-5. For this purpose, the proppant pack was flushed with a 2% KCl solution under pressure and a thermal load in the so-called "Conductivity Cell" and the conductivity was determined.

Figure 1:
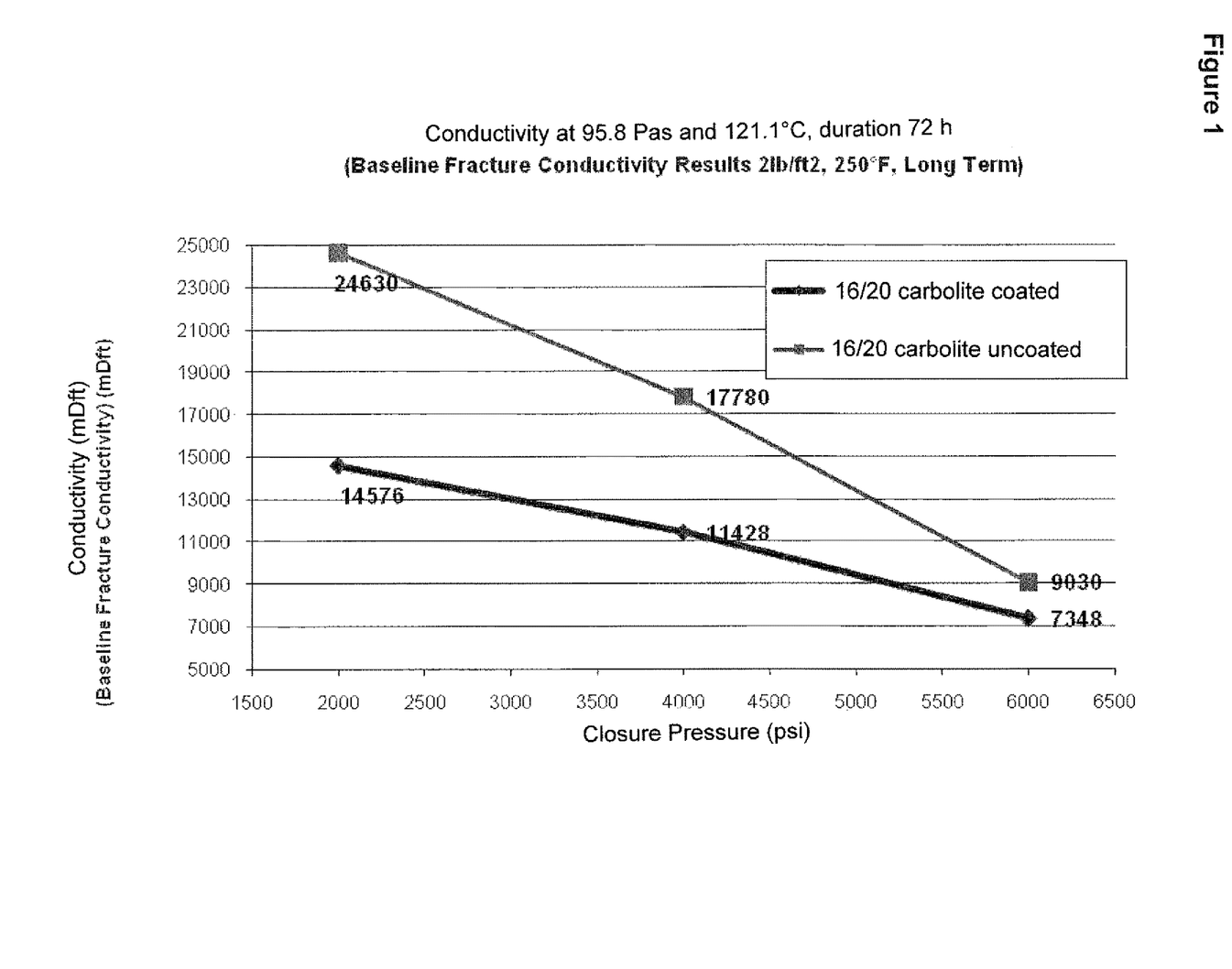
FIG. 1: Conductivity according to DIN EN ISO 13503-5 of coated proppants according to the present invention and uncoated proppants as a function of the pressure load (see Example 6).

The following table as well as FIG. 1 show the data obtained for batch 7 of Example 4 and 5 in comparison with the data relating to uncoated proppants (Carbolite 16/20 (Carbo Ceramics Inc.)).

TABLE 3

Carbolite 16/20 proppants coated with 3% of the resin according to the present invention - compared to uncoated Carbolite 16/20 proppants

| | Conductivity | |
|---|---|---|
| Pressure kPa (psi) | coated FCD* (mDft) | uncoated FCD* (mDft) |
| 13790 (2000) | 14576 | 24630 |
| 27580 (4000) | 11428 | 17780 |
| 41370 (6000) | 7348 | 9030 |
| 55160 (8000) | 2999 | 4620 |
| 68950 (10000) | 1147 | 2400 |

| | Change in fracture width | |
|---|---|---|
| Pressure kPa (psi) | coated width (mm) | uncoated width (mm) |
| 13790 (2000) | 6.01 | 5.83 |
| 27580 (4000) | 5.87 | 5.67 |
| 41370 (6000) | 5.67 | 5.40 |

| | Permeability | |
|---|---|---|
| Pressure kPa (psi) | coated Perm (D) | uncoated Perm (D) |
| 13790 (2000) | 739 | 1288 |
| 27580 (4000) | 593 | 956 |
| 41370 (6000) | 395 | 510 |

(*FCD: "Fracture Conductivity")

Uncoated proppants typically exhibit a higher degree of conductivity since the coating is somewhat plastic which makes the hollow spaces narrower. However, uncoated proppants do not exhibit any flowback control properties and are washed out of the frac.

As is shown in FIG. 1, the curve of the coated proppants which shows the conductivity as a function of the pressure load is significantly flatter than that of the uncoated proppants and shows good conductivity even at 6000 psi (41370 kPa).

Example 7

Flowback Control

The flowback behavior of the coated proppants was determined in the so-called "cyclic stress test". This test shows how the solidified proppant pack reacts to changes in pressure which are also realistic in underground deposits.

For this purpose, proppants from batch no. 7 in Example 4 were first solidified in a test cell under the pressure and temperature conditions listed in the table below.

| Duration (h) | Temperature (° C.) | Pressure (psi) | Pressure (kPa) |
|---|---|---|---|
| 0 | 33.4 | 0 | 0 |
| 0.33 | 42 | 0 | 0 |
| 0.67 | 47 | 1000 | 6895 |
| 1 | 47.2 | 1000 | 6895 |
| 2 | 62.3 | 1000 | 6895 |
| 3 | 71 | 1000 | 6895 |
| 4 | 86.8 | 1000 | 6895 |
| 6 | 87.9 | 1000 | 6895 |
| 12 | 93.3 | 1000 | 6895 |

After this solidification, the proppant pack was subjected to cycles of different pressure loads and flushed with KCl solution transversely to the direction of the pressure; each cycle was 90 minutes long. During the entire measurement, the change in the thickness of the proppant pack (fracture width) caused by the change in pressure was measured. In addition, the amount of proppant washed out by the stream of the KCl solution was determined.

Figure 2:
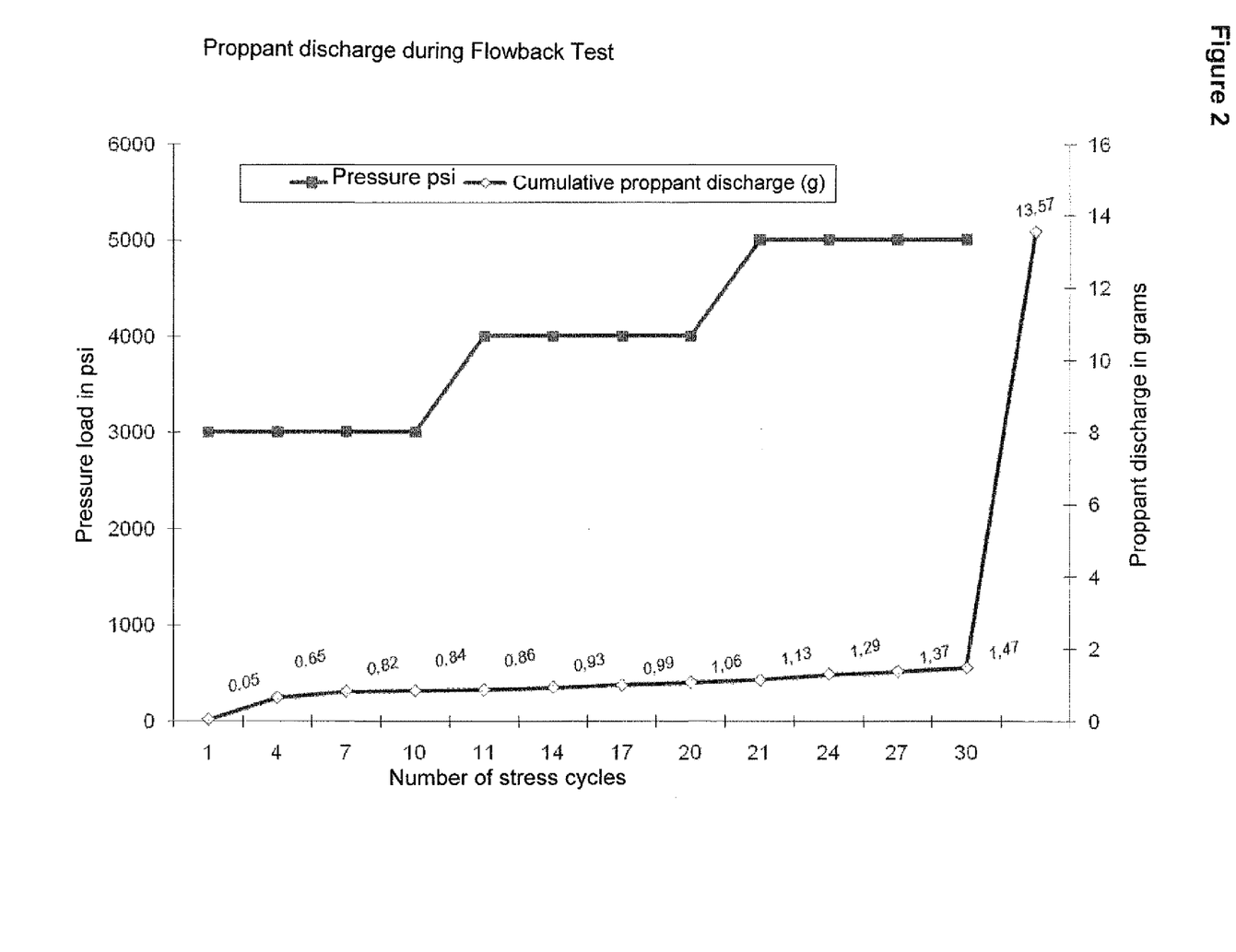
FIG. 2: Discharged amount of coated proppants according to the present invention in the cyclic stress test (see Example 7).
Figure 3:
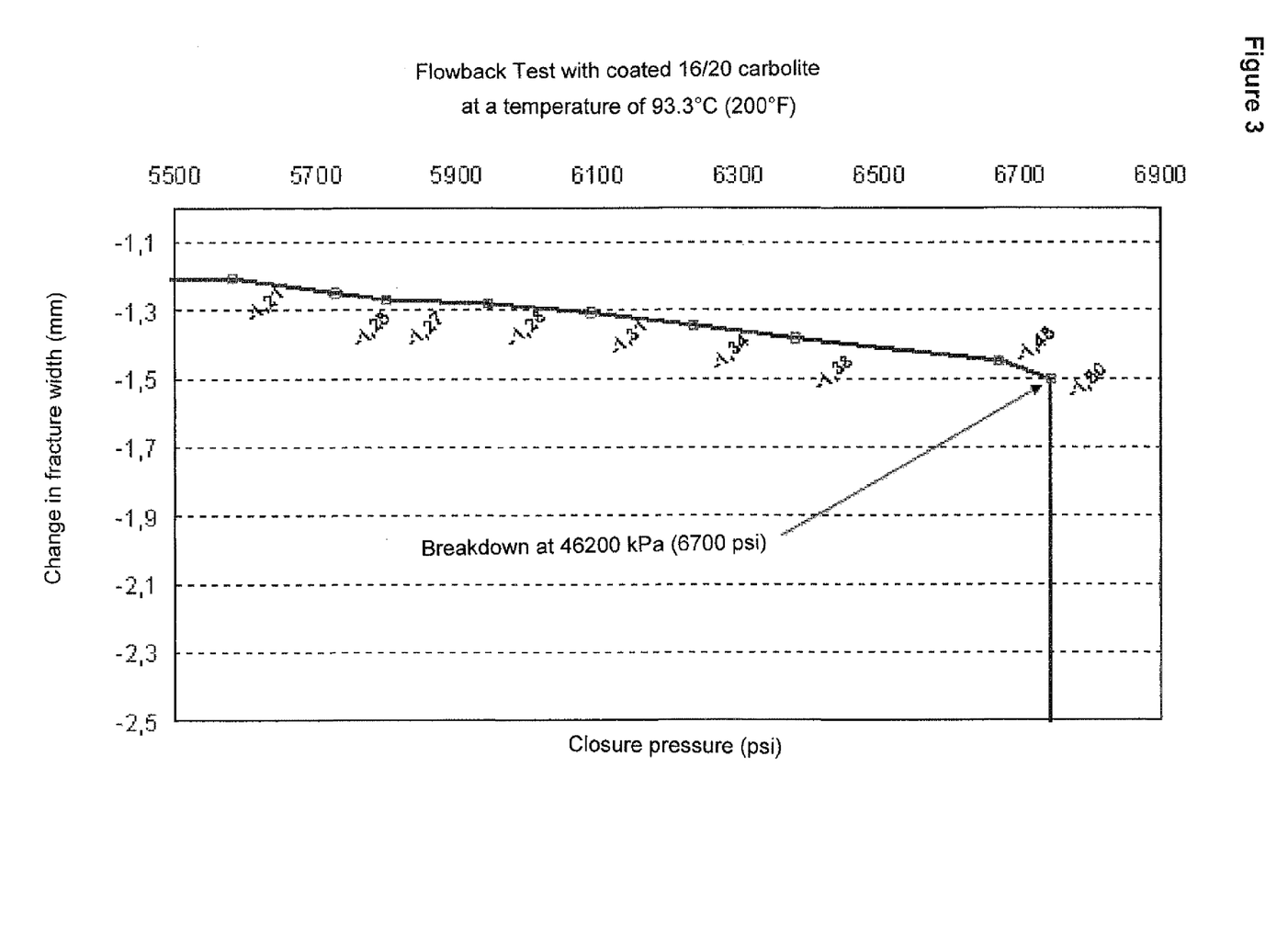
FIG. 3: Change in fracture width (thickness of the proppant pack of proppants coated according to the present invention) as a function of pressure in the cyclic stress test (see Example 7).

The following values and the diagrams shown in FIGS. 2 and 3 refer to batch 7 of Example 4.

In the first step, the pressure was increased from 1000 to 3000 psi (6895 to 20684 kPa) and decreased 10 times with one cycle lasting 90 minutes. In the second step, the pressure was modified 10 times between 1000 and 4000 psi (6895 and 27579 kPa), and in the third step, the pressure was modified 10 times between 1000 and 5000 psi (6895 and 34474 kPa). During a subsequent increase in pressure to 7000 psi (48263 kPa), the proppant pack broke down at 6700 psi (46195 kPa) (see FIG. 2).

Proppant Discharge from the Pack During the Cyclic Stress Test

After every third high pressure cycle, the pack was flushed with 200 psi/foot (4524 kPa/m) and the amount of discharged proppant was collected and weighed. No significant amounts were discharged until the breakdown of the pack.

| Cycle | Pressure (psi) | Pressure (kPa) | Proppant discharge (g) | Cumulative Proppant discharge (g) |
|---|---|---|---|---|
| 1 | 3000 | 20684 | 0.05 | 0.05 |
| 4 | 3000 | 20684 | 0.6 | 0.65 |
| 7 | 3000 | 20684 | 0.17 | 0.82 |
| 10 | 3000 | 20684 | 0.02 | 0.84 |
| 11 | 4000 | 27580 | 0.02 | 0.86 |
| 14 | 4000 | 27580 | 0.07 | 0.93 |
| 17 | 4000 | 27580 | 0.06 | 0.99 |
| 20 | 4000 | 27580 | 0.07 | 1.06 |
| 21 | 5000 | 34474 | 0.07 | 1.13 |
| 24 | 5000 | 34474 | 0.16 | 1.29 |
| 27 | 5000 | 34474 | 0.08 | 1.37 |
| 30 | 5000 | 34474 | 0.1 | 1.47 |
|  |  |  | 12.1 | 13.57 |
|  |  |  |  | Breakdown at 6700 psi (46195 kPa) |

In addition to the discharge, the change in fracture width was measured within the framework of this cycle test. The results are shown in FIG. 3.

The values listed above as well as FIGS. 2 and 3 show that the proppants coated according to the present invention exhibit excellent flowback behavior up to a pressure of 6700 psi (46195 kPa) and are mechanically stable, which is demonstrated by the minor change in the fracture width.

Example 8

Postcuring Properties of the Coated Proppants

The coating system according to the present invention was examined using Fourier Transformation Infrared Spectroscopy (FTIR spectroscopy) in order to determine the postcuring properties of the coating material according to the present invention which is decisive for the flowback control effect, i.e. the possibility of fixing the proppants in the frac and thus preventing them from being washed out.

For this purpose, the polyol components A, B, C and D of Example 2 were each mixed with the isocyanate component of Example 3, applied to a glass plate at a layer thickness of 60 μm and cured by applying gaseous triethylamine. After 24 hours of storage, the amount of free isocyanate groups (% NCO) was determined by means of FTIR spectroscopy.

The free isocyanate groups can continue to react under the conditions prevailing in the frac (pressure, temperature and water) and thus cause postcure of the proppant layer in the frac which achieves the flowback control effect. In order to confirm this point, the coated glass plates were subsequently treated in boiling water for 24 hours. Then the amount of free NCO groups was measured again.

| Sample | Mixing ratio Polyol (wt.-%)/ Isocyanate (wt.-%) | NCO content % after 24 h at 20° C. | NCO content % after 24 h at 100° C. water storage |
|---|---|---|---|
| A | 40:60 | 3.0 | 0.02 |
| A | 30:70 | 3.4 | 0.03 |
| B | 40:60 | 3.1 | 0.02 |
| C | 40:60 | 2.9 | 0.03 |
| D | 40:60 | 3.1 | 0.02 |

The above table shows that after gas treatment and storage at room temperature, there were still about 3% free NCO groups present. These free NCO groups react at elevated temperatures in the presence of water and cause the postcuring which is important for the flowback control effect.

Batch 9 of Example 4 was also investigated. The results are shown in the following table.

| Sample | Mixing ratio Polyol (wt.-%)/ Isocyanate (wt.-%) | NCO content % after 24 h at 20° C. | NCO content % after 24 h at 100° C. water storage |
|---|---|---|---|
| 9 | 20:80 | 3.0 | 0.04 |

The invention claimed is:

1. A process for the production of coated proppants, comprising the following steps:
   (a) mixing a proppant with a polyol component and an isocyanate component, wherein the polyol component consists of a phenolic resin and optionally one or more other hydroxy group-containing compounds, wherein the isocyanate component consists of an isocyanate having at least 2 isocyanate groups and optionally one or more other isocyanate group-containing compounds, and wherein x parts by weight of the isocyanate component are used with respect to 100 parts by weight of the polyol component, with x being about 105% to about 550% of the isocyanate value defined below:

$$\text{isocyanate value} = \frac{42 \cdot 100 \cdot \text{OH content (\%) of the polyol component}}{17 \cdot \text{NCO content (\%) of the isocyanate component}}$$

(b) curing the mixture obtained in step (a) by treatment with a catalyst; and
   (c) optionally repeating steps (a) and (b) one or more times, wherein the mixture obtained in the preceding step (b) or the proppant isolated therefrom is used as a proppant in step (a), wherein the polyol component in step (a) is the same as or different from the polyol component used in the previous step (a), and wherein the isocyanate component in step (a) is the same as or different from the isocyanate component used in the previous step (a);
   wherein the coated proppants comprise a mixture of coated individual particles and of aggregates which comprise more than one proppant particle and wherein the amount of aggregates accounts for at most 10 wt % based on the weight of the mixture.

2. A process according to claim 1, wherein ceramic particles or sand is used as the proppant.

3. A process according to claim 2, wherein ceramic particles selected from alumina, silica, titania, zinc oxide, zirconia, ceria, manganese dioxide, iron oxide, calcium oxide or bauxite as well as mixtures thereof are used as the proppant.

4. A process according to claim 2, wherein the ceramic particles or the sand have an average particle size of about 50 µm to about 3000 µm.

5. A process according to clam 1, wherein the phenolic resin is a phenolic resin of the resol- or the novolak-type.

6. A process according to claim 5, wherein the phenolic resin is a resol-type phenolic resin obtained by the condensation of phenol or one or more compounds having the formula (I) with an aldehyde under basic conditions:

(I)

wherein:
   each R is independently a halogen atom, $C_{1-16}$-alkyl or OH; and
   p is an integer from 0 to 4.

7. A process according to claim 5, wherein the phenolic resin is a novolak-type phenolic resin obtained by the condensation of phenol or one or more compounds having the formula (I) with an aldehyde under acidic conditions:

(I)

wherein:
   each R is independently a halogen atom, $C_{1-16}$-alkyl or OH; and
   p is an integer from 0 to 4.

8. A process according to claim 1, wherein the phenolic resin is a benzyl ether resin having the formula (II)

(II)

wherein:

A, B and D are each independently a hydrogen atom, a halogen atom, a $C_{1-16}$-hydrocarbon group, -($C_{1-16}$-alkylene)-OH, —OH, an —O—($C_{1-16}$-hydrocarbon group), phenyl, -($C_{1-6}$-alkylene)-phenyl, or -($C_{1-6}$-alkylene)-phenylene-OH;

R is a hydrogen atom or a $C_{1-6}$-hydrocarbon group;

$m^1$ and $m^2$ are each independently 0 or 1;

n is an integer between 0 and 100; and the sum of n, $m^1$ and $m^2$ is at least 2.

9. A process according to claim 1, wherein the phenolic resin comprises monomer units based on cardol and/or monomer units based on cardanol.

10. A process according to claim 1, wherein the phenolic resin is a phenolic resin obtained by the condensation of cardol and/or cardanol with an aldehyde.

11. A process according to claim 1, wherein the other hydroxy-group-containing compounds comprise cardol and/or cardanol.

12. A process according to claim 1, wherein the isocyanate having at least 2 isocyanate groups is a compound having the formula (III):

(III)

wherein:
A is an aryl, heteroaryl, cycloalkyl or heterocycloalkyl;
each $R^1$ is independently a covalent bond or $C_{1-4}$-alkylene;
each $R^2$ is independently halogen, $C_{1-4}$-alkyl or $C_{1-4}$-alkoxy;
p is 2, 3 or 4; and
q is an integer from 0 to 3;
or wherein the isocyanate having at least 2 isocyanate groups is a compound having the formula (IV):

(IV)

wherein:
each A is independently aryl, heteroaryl, cycloalkyl or heterocycloalkyl;
each $R^1$ is independently a covalent bond or $C_{1-4}$ alkylene;
each $R^2$ is independently halogen, $C_{1-4}$-alkyl or $C_{1-4}$-alkoxy;
$R^3$ is a covalent bond, a $C_{1-4}$-alkylene or a group —$(CH_2)_{R31}$—O—$(CH_2)_{R32}$-, wherein R31 and R32 are each independently 0, 1, 2 or 3;
each q is independently an integer from 0 to 3; and
r and s are each independently 0, 1, 2, 3 or 4, wherein the sum of r and s is 2, 3 or 4.

13. A process according to claim 1, wherein the isocyanate with at least 2 isocyanate groups is selected from toluene-2,4-diisocyanate, toluene-2,6-diisocyanate, 1,5-naphthalenediisocyanate, cumene-2,4-diisocyanate, 4-methoxy-1,3-phenyldiisocyanate, 4-chloro-1,3-phenyldiisocyanate, diphenylmethane-4,4-diisocyanate, diphenylmethane-2,4-diisocyanate, diphenylmethane-2,2-diisocyanate, 4-bromo-1,3-phenyldiisocyanate, 4-ethoxy-1,3-phenyldiisocyanate, 2,4'-diisocyanatediphenylether, 5,6-dimethyl-1,3-phenyldiisocyanate, 2,4-dimethyl-1,3-phenyldiisocyanate, 4,4-diisocyanatodiphenylether, 4,6-dimethyl-1,3-phenyldiisocyanate, 9,10-anthracenediisocyanate, 2,4,6-toluenetriisocyanate, 2,4,4'-triisocyanatodiphenylether, 1,4-tetramethylenediisocyanate, 1,6-hexamethylenediisocyanate, 1,10-decamethylene-diisocyanate, 1,3-cyclohexylenediisocyanate, 4,4'-methylene-bis-(cyclohexylisocyanate), xylenediisocyanate, 1-isocyanato-3-methylisocyanate-3,5,5-trimethylcyclohexane, 1-3-bis(isocyanato-1-methylethyl)benzene, 1,4-bis(isocyanato-1-methylethyl)benzene, oligomers or polymers thereof, or mixtures thereof.

14. A process according to claim 1, wherein x is about 105% to 300% of the isocyanate value.

15. A process according to claim 1, wherein in step (a) one or more additives selected from a solvent, a plasticizer, a wetting agent, a molecular sieve for removing reaction water, a diluent, and an adhesion promoter are mixed with the proppant, the polyol component and the isocyanate component.

16. A process according to claim 1, wherein step (a) is carried out at a temperature of about 10° C. to about 50° C.

17. A process according to claim 1, wherein the water content of the mixture obtained in step (a) is less than 10 wt.-%, based on the total weight of the mixture as 100 wt.-%.

18. A process according to claim 1, wherein the catalyst in step (b) is selected from nitrogen-containing compounds, organometallic compounds or combinations thereof.

19. A process according to claim 18, wherein the catalyst is an amine, an organotin compound or a combination thereof.

20. A process according to claim 19, wherein the amine is a compound having the formula $(R)_3N$, wherein R is independently a $(C_{1-6})$-hydrocarbon group optionally substituted with one or more hydroxy groups.

21. A process according to claim 19, wherein the amine is selected from trimethylamine, triethylamine, dimethylethylamine, dimethylisopropylamine, dimethylpropylamine, triethanolamine, vinylimidazole, 1,4-diazabicyclo[2.2.2]octane or a mixture thereof.

22. A process according to claim 19, wherein the organotin compound is a compound of the formula $(R^1)_2Sn(R^2)_2$, wherein $R^1$ is independently a $(C_{1-20})$-hydrocarbon-carbonyloxy group and $R^2$ is independently a $(C_{1-8})$-hydrocarbon group.

23. A process according to claim 19, wherein the organotin compound is dibutyltin dilaurate.

24. A process according to claim 1, wherein, in step (b), a gaseous catalyst is applied to the mixture obtained in step (a), wherein the catalyst is optionally a nitrogen-amine mixture or an air-amine mixture, wherein the amine is optionally selected from trimethylamine, triethylamine, dimethylethylamine, dimethylpropylamine, dimethylisopropylamine or a mixture thereof.

25. A process according to claim 1, wherein the curing in step (b) is carried out at a temperature of about 10° C. to about 50° C. and a pressure of about 50 kPa to about 200 kPa.

26. A process according to claim 1, wherein in step (c) the steps (a) and (b) are repeated one to five times.

27. A coated proppant, obtained by the process according to claim 1.

28. A method of production of crude oil or natural gas comprising the use of a frac liquid comprising the coated proppant according to claim 27.

29. A process for producing oil or gas, comprising introducing the frac liquid according to claim 28 into a rock layer containing crude oil or natural gas.

30. A process according to claim 29, wherein the introduction of the coated proppant causes the formation of a frac in the rock layer containing crude oil or natural gas and the coated proppant undergo postcuring in the frac.

31. A process according to claim 30, wherein the coated proppant undergo postcuring in the frac at a pressure in the range of about 690 to about 34500 kPa, a temperature in the range of about 50 to about 250° C. and in the presence of water.

32. The method according to claim 28, wherein the frac liquid comprises water gelled with polymer, an oil-in-water emulsion gelled with polymer or a water-in-oil emulsion gelled with polymer.

33. The process according to claim 29, wherein the frac liquid comprises water gelled with polymer, an oil-in-water emulsion gelled with polymer or a water-in-oil emulsion gelled with polymer.

34. A process according to claim 1, wherein x is about 110% to about 230% of the isocyanate value.

* * * * *